United States Patent [19]

Fujita et al.

[11] Patent Number: 4,887,109
[45] Date of Patent: Dec. 12, 1989

[54] VIEWFINDER FOR A CAMERA WITH CHANGEABLE FOCAL LENGTH

[75] Inventors: Yoshihiro Fujita; Hiroshi Komatsuzaki, both of Tokyo; Masao Shoji, Saitama; Yukio Noguchi, Saitama; Masayoshi Hirai, Saitama; Kazunori Ohno, Saitama, all of Japan

[73] Assignee: Fuji Photo Film Co. Ltd., Kanagawa, Japan

[21] Appl. No.: 199,756

[22] Filed: May 27, 1988

[30] Foreign Application Priority Data

May 27, 1987 [JP] Japan .............................. 62-80676[U]
May 27, 1987 [JP] Japan .............................. 62-80677[U]
Apr. 13, 1988 [JP] Japan .................................. 63-90854

[51] Int. Cl.$^4$ ............................................. G03B 13/14
[52] U.S. Cl. ............................... 354/222; 354/195.12; 354/221; 350/422; 350/423
[58] Field of Search ................... 354/195.12, 221, 222, 354/195.1; 350/422, 423

[56] References Cited

U.S. PATENT DOCUMENTS

| | | | |
|---|---|---|---|
| 2,062,585 | 12/1936 | Laube et al. | 354/221 |
| 2,995,061 | 8/1961 | Briskin et al. | 354/221 |
| 4,038,673 | 7/1977 | Schroder et al. | 354/222 |
| 4,119,983 | 10/1978 | Tanaka | 354/222 |
| 4,129,369 | 12/1978 | Kobayashi et al. | 354/195.12 |
| 4,715,692 | 12/1987 | Yamada et al. | 354/222 |

*Primary Examiner*—A. A. Mathews
*Attorney, Agent, or Firm*—Young & Thompson

[57] ABSTRACT

A camera having a viewfinder and a taking lens changeable in focal length between at least two different focal lengths: a relatively short focal length suitable for wide-angle photography and a relatively long focal length suitable for telephotography and that allows close-up photography when the taking lens is changed to have the long focal length. The viewfinder has at least one movable lens which is axially moved and shifted away from the optical axis of the finder with respect to the axis of the taking lens when the taking lens is changed in focal length, to deflect the optical axis of the finder in order to cancel parallax error, depending on object distance.

10 Claims, 7 Drawing Sheets

FIG. 1
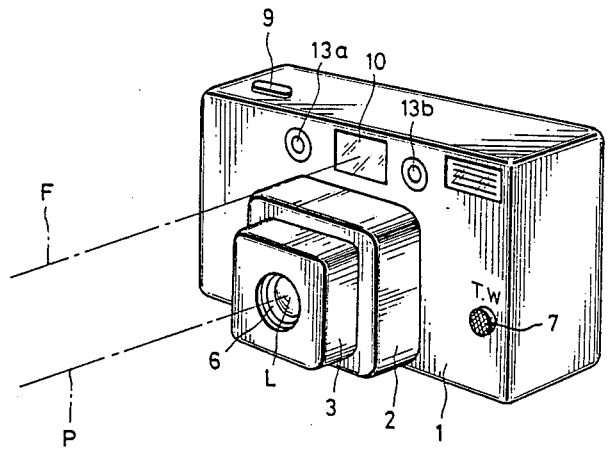
FIG. 2A
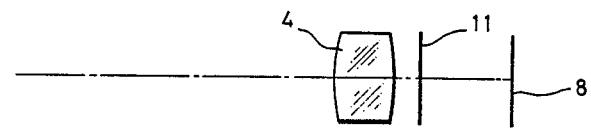
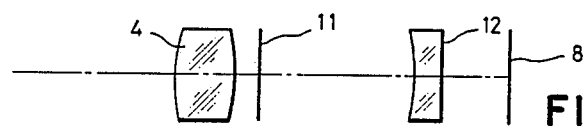
FIG.2B
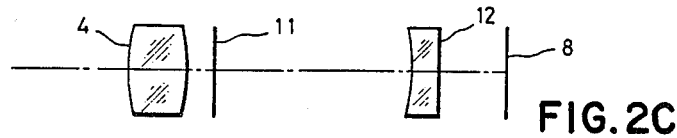
FIG.2C

VIEWFINDER FOR A CAMERA WITH CHANGEABLE FOCAL LENGTH

BACKGROUND OF THE INVENTION

The present invention relates to a camera having a viewfinder, and more particularly to such a camera which is changed suitably for wide-angle photography, telephotography or macro photography by changing the focal length thereof.

Numerous compact cameras having lens shutters are already known. Some such compact cameras are provided with taking lenses of the type that the focal length can be changed between a relatively short focal length of about 35 mm suitable for wide-angle photography and a relatively long focal length of about 70 mm suitable for telephotography. Such focal length changeable cameras are provided with viewfinders of the type that the magnification of the finder is changeable according to the focal length of camera. Such a viewfinder has two concave lens for forming a finder optical lens system suitable for wide-angle photography. When the camera is changed suitably for telephotography, one of the two concave lenses is displaced from the optical path of the finder lens system simultaneously with the axial movement of the other concave lens, thereby changing the magnification of the finder suitably for telephotography.

Such a camera has a viewfinder which is place at some distance from the taking lens of the camera and has an optical axis parallel to the optical axis of the taking lens, and the result is a change in appearance and orientation of objects seen from different viewpoints, which is referred to as parallax. The error of parallax becomes greater as the camera is moved closer to the subject. For instance, when the camera is used at a distance of about 1 m, the viewfinder and the taking lens have substantially different views of the scene. This difference becomes greater when the camera is used for close-up photography. This leads to incorrect framing, or incorrect focusing.

For overcoming this parallax problem in the cameras that are used for close-up photography, it is known to use an optical wedge which is moved into and displaced from the optical path of the viewfinder to deflect the optical axis of the viewfinder optical system. However, in this case, the viewfinder optical system with its associated mechanism unavoidably becomes complicated. Specifically, the provision of such an optical wedge for deflecting the optical axis of the viewfinder requires the provision of complicated mechanism for inserting the optical wedge into the optical path of the viewfinder in order to cancel parallax error, in addition to the provision of mechanism for axially moving the objective lens of the viewfinder or optical system, or inserting one or more lenses into the optical path of the viewfinder in order to change the magnification of the viewfinder. Furthermore, a mechanism is needed to link these mechanisms with a mechanism for changing the focal length of taking lens.

An alternative and simpler way of overcoming the parallax problem is to provide two or more finder frames in the finder changeable according to the focal lengths of the taking lens or to place one or more marks in the finder indicating the center or the top of a finder frame.

Meanwhile, a recent tendency in such focal length changeable cameras is to provide zoom lenses as the taking lens. When a camera has a zoom lens, it must necessarily be equipped with a zoom finder which is changed in magnification corresponding to zooming of the zoom lens in order to provide the same views of the scene independently of the object distances. The zoom finder and the zoom lens, however, give different views of the scene because of the magnification of the zoom finder and the zoom lens. Therefore, although the above described means for overcoming the parallax problem are effective to correct parallax caused by object distances, they are unable to eliminate parallax error caused by the magnification of the zoom finder.

OBJECTS OF THE INVENTION

It is, therefore, an object of the present invention to provide a viewfinder used on a focal length changeable camera which is changeable in view field according to the focal length of camera.

It is another object of the present invention to provide a zoom finder used on a focal length changeable camera which is changeable in view field according to the magnification of the zoom finder.

SUMMARY OF THE INVENTION

For accomplishing the above-described objects, the present invention provides a focal length changeable camera having a viewfinder including at least a movable lens which is axially movable and shiftable away from the optical axis of the viewfinder with respect to the taking lens of the camera when changing the focal length of the camera.

According to a preferred embodiment of the present invention, the viewfinder, which is incorporated in a camera changeable between a relatively short focal length suitable for wide-angle photography or macro photography and a relatively long focal length suitable for telephotography, comprises a fixed eyepiece lens, a movable lens which is axially moved and shifted away from the optical axis of the finder with respect to the taking lens when the camera is changed suitably for macro photography and an extra lens which is moved into the optical path of the finder only when the camera is changed suitably for telephotography. Either one of the movable lens and the extra lens is shifted away from the optical axis of the finder when the camera is changed suitably for telephotography.

According to another preferred embodiment of the present invention, the viewfinder, which is formed as a zoom finder incorporated in a camera with a zoom lens, includes a conversion lens which is axially moved and shifted away from the optical axis of the zoom finder when the zoom lens is changed in focal length.

By shifting the axially movable lens according to the focal length of camera so as to deflect the optical axis of the finder, the finder and the taking lens have practically the same views of the scene, thereby allowing correct framing and correct focusing.

BRIEF DESCRIPTION OF THE DRAWINGS

The above and other objects and features of the invention will become apparent to those skilled in the art from the following description of preferred embodiments considered with the accompanying drawings, in which:

FIG. 1 is a perspective view showing a focal length changeable camera embodying the present invention;

FIGS. 2(A), (B) and (C) are diagrammatic illustrations showing the taking lens system having different focal lengths;

DETAILED DESCRIPTION OF THE INVENTION

Figure 3:
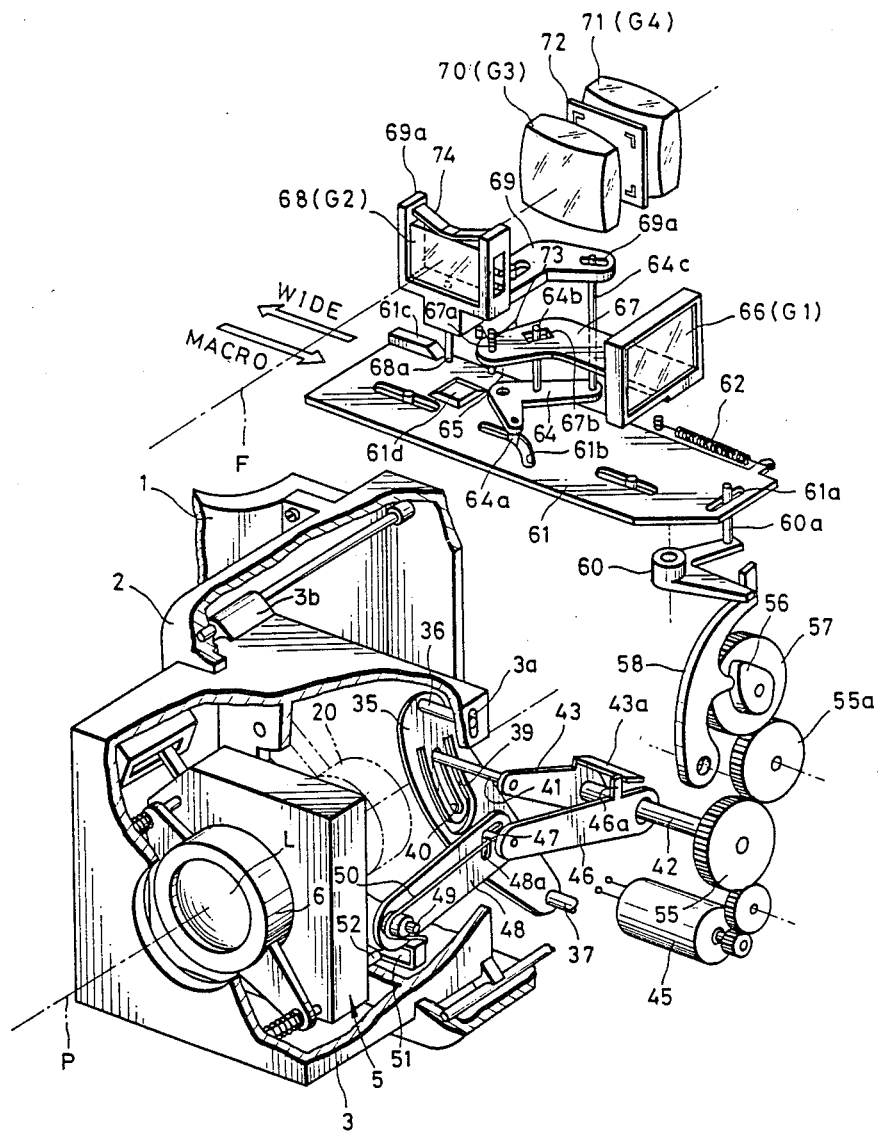
FIG. 3 is an exploded perspective view showing the essential parts of the camera of FIG. 1.

A viewfinder according to a preferred embodiment of the present invention is incorporated in a compact still picture camera of the type in which the focal length thereof is changeable. Because such cameras are well known, this description will be directed in particular to elements forming part of or cooperating directly with apparatus embodying the present invention. It is to be understood, however, that camera elements not specifically shown or described may take various forms known to those skilled in the camera art.

Referring now to the drawings, in particular to FIG. 1, there is shown a focal length changeable compact camera equipped with a viewfinder 10 embodying the present invention, which has a camera body 1 provided with a fixed outer lens barrel 2. Slidably supported in this outer lens barrel 2 for axial movement is a movable inner lens barrel 3 which supports therein a movable unit 5 including a lens barrel 6 with a taking lens system L incorporated therein. This movable unit 5, which can move axially in and relative to the inner lens barrel 3, incorporates therein a mechanical driver actuated in cooperation with an automatic focusing device described later to move axially the lens barrel 6 so as to adjust the focus of the taking lens system L, and a shutter mechanism. It is to be noted that the lens barrel 6 is axially movable relative to the movable unit 5.

The camera body 1 is provided on its front wall with a photographic mode selecting button 7 for selectively setting the taking lens system L to a wide-angle photographic mode (which is hereinafter referred to as a wide-angle mode for simplicity) or a telephotographic mode (which is hereinafter referred to as a telephoto mode for simplicity), an active type automatic focusing device having light projecting means 13a and light detecting means 13b, and on its top wall a shutter release button 9.

If the camera has been set to the wide-angle mode in which the taking lens system L has a relatively short focal length, the taking lens system L has the lens arrangement shown in FIG. 2(A) in which the objective lens 4 is at the closest position to a film 8. When the camera is set to the wide-angle mode and the shutter button 9 is pressed in half way, the automatic focusing device is actuated, causing the light projecting means 13a to project a light beam toward the subject to be photographed in order to detect the subject distance. The light reflected from the subject is received by the light receiving means 13b to determine the distance of the subject. Consequently, according to the determined subject distance, the lens barrel 6 having the objective lens 4 is axially moved with respect to the movable unit 5 so as to focus the taking lens on the subject. Thereafter, the shutter 11 is actuated to open and close, effecting an exposure.

Upon pushing the photographic mode selecting button 7 in a direction to set the camera in the tele-photo mode, the movable barrel 3 is axially moved to shift the objective lens 4 forwardly and, simultaneously, a conversion lens 12 is moved into the optical path and is brought into axial alignment with the objective lens 4 as is shown in FIG. 2(B). As a result, the taking lens system L including the objective lens 4 and the conversion lens 12 provides a telephotographic lens arrangement having a long focal length. In the same manner as in the wide-angle mode, the camera is operated to make an exposure by pushing the shutter release button 9.

The camera set in the telephoto mode can be shifted to a macro-photographic mode (which is hereinafter referred to as a macro mode for simplicity). In this macro mode, the taking lens system L has the lens arrangement shown in FIG. 2(C). As will be specifically described later, the camera is set in the macro mode by further moving the movable unit 5 forwardly to space the objective lens 4 farther from the film 8.

Reference is now had to FIG. 3 for a description of the movable elements, the movable barrel 3 and the movable unit 5. In a rear portion of the movable barrel 3, there is formed a vertical slot 3a which receives a connecting pin 36 fixed to one end of a thrusting lever 35 made of, for example, a thin resilient metal plate. This thrusting lever 35 is pivotally mounted on the camera body 1 by means of a shaft 37 for pivotal movement. At the middle of the thrusting lever 35 there is a slot 40 surrounded by a generally U-shaped slot 39. This slot 40 receives a connecting rod 41 extending from a rotatable arm 43 fixed to a shaft 42 whose opposite end is fixed to a gear 55. This rotatable arm 43 is rotated by means of a motor 45 through a gear train.

A shift lever 46, which functions to shift the taking lens system L into the macro mode, is mounted for rotation on and relative to the shaft 42. The shift lever 46 is provided near its end portion with a lug 46a in engagement with a projection 43a extending laterally from the rotatable arm 43. Through this engagement, the shift lever 46 is turned when the rotatable rm 43 turns in the counterclockwise direction through a certain angle. Fixed to the other end of the shift lever 46 is an actuating pin 47 which engages with a generally L-shaped slot 48a formed in a link lever 48. This link lever 48 is mounted for rotation on a pivot 49 fixed to the interior of the fixed barrel 2. Disposed between the actuating pin 47 and the link lever 48 is a torsion spring 50 by means of which swinging motion of the shift lever 46 is transferred to the link lever 48. Specifically, counterclockwise rotation of the shift lever 46 causes the actuating pin 47 to bend the torsion spring 50 downwardly. As a result, the link lever 48 turns clockwise about the pivot 49.

The link lever 48 is provided at its pivoted end with a push lug 51 formed integrally therewith which pushes a pin 52 which is fixed to a rear end portion of the movable unit 5 and which passes through a partition wall of the movable barrel 3 when the link lever 48 turns in the clockwise direction.

The gear 55 fixed to one end of the shaft 42 is coupled to a gear 57 provided with a cam member 56 fixed thereto through an idler gear 55a. The cam member 56 bears against a cam lobe of a cam follower lever 58. Therefore, rotation of the gear 55 causes the cam member 56 to turn, swinging the cam follower lever 58. When the cam follower lever 58 swings counterclockwise as seen in FIG. 3, a crank lever 60 is turned clockwise so as to shift a sliding plate 61. For causing this shift of the sliding plate 61, the crank lever 60 and the sliding plate 61 are coupled by means of a pin-slot arrangement 60a–61a. The sliding plate 61 is urged by a spring 62 to the left as viewed in FIG. 3.

The sliding plate 61 is formed with a dog leg-like cam slot 61b at its middle in which is engaged a pin 64a fixed to a lever 64. The sliding plate 61 has raised portions 61c and 61d. The lever 64 with connecting rods 64b and 64c fixed thereto is pivotally mounted on a shaft 65 fixed to the camera body 1. These connecting rods 64b and 64c engage respectively in a slot 67b formed in a first holding lever 67 for a first movable or conversion lens (G1) 66 of a finder optical system, and a slot 69a formed in a second holding lever 69 for a second movable lens (G2) 68 of the finder optical system. The first holding lever 67 is urged by means of a spring 73 to turn in the clockwise direction.

The finder optical system, as is shown in FIG. 4, comprises first and second movable lenses 66 and 68, fixed lens (G3) 70, a reticle 72, and fixed lens (G4) 71, in this order. Onto the front surface of the fixed lens 70 a halfmirror coating layer 70a is applied. As is well known in the art, an image of a viewing frame of the reticle 72 is observed through the fixed lens 71.

The second movable lense (G2) 68 is adapted to move up in a holding frame 69a which is fixed to the second holding lever 69. Specifically, the second movable lens 68 is ordinarily pressed down by means of a leaf spring 74 attached to the top end of the holding frame 69a so as normally to be in its lowered position as shown in FIG. 3.

When the lever 64 turns in response to a sliding motion of the sliding plate 61, the first holding lever 67 is turned about shaft 67a through the pin-slot arrangement at 64b, 67b and, on the other hand, the second holding lever 69 is moved along the optical axis F of the finder optical system through the pin-slot arrangement 64c, 69a. When, for example, the sliding plate 61 moves from the position shown in FIG. 3 toward the left, the lever 64 turns in the clockwise direction, turning the first holding lever 67 in the clockwise direction so as to place the first movable lens (G1) 66 on the optical axis F and, simultaneously, moving the second holding lever 69 forwardly along the optical path F to shift the second movable lens (G2) 68. At this time, the raised portion 61d formed on the sliding plate 61 raises a leg 68a integral with the second movable lens (G2) 68, against the action of leaf spring 74, thereby raising the second movable lens (G2) 68 a distance y which is equal to the height of the raised portion 61d. On the other hand, when the sliding plate 61 is further moved to the right as viewed in FIG. 3, the raised portion 61c raises the second movable lens (G2) 68 a distance x which is equal to the height of the raised portion 61c.

Figure 4A:
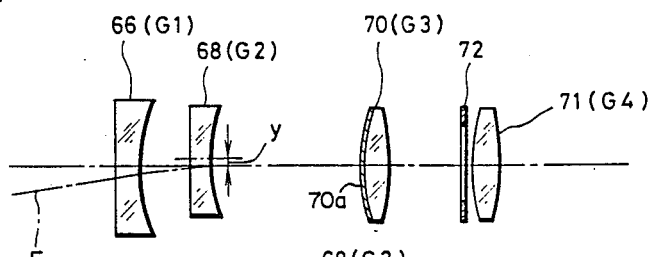
FIGS. 4(A), (B) and (C) are diagrammatic illustrations showing the viewfinder lens system changeable in focal length incorporated in the camera of FIG. 1.
Figure 4B:
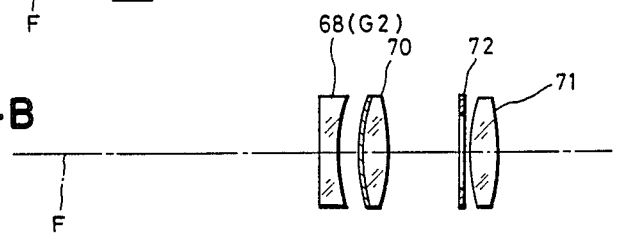

The viewfinder 10 incorporated in the focal length changeable camera thus constructed is operated as follows:

Assuming that the camera is set in the telephoto mode, the finder optical system has the lens arrangement shown in FIGS. 3 and 4(B) comprising the lens elements 68, 70 and 71 which has a magnification suitable for telephotography. When the photographic mode selecting button 7 is operated to change the photographic mode of the camera from the telephoto mode to the macro mode, the motor 45 is caused to rotate to turn the gear 55 in the counterclockwise direction from the position shown in FIG. 3. Consequently, the rotatable arm 43 swings in the counterclockwise direction, swinging the shift lever 46 in the counterclockwise direction with the projection 43a. By the motion of the shift lever 46, the link lever 48 is turned in the clockwise direction as a result of bending of the torsion spring 50.

Although the rotatable arm 43 is swung in order to turn the link lever 48 in the counterclockwise direction, since the movable barrel 3, in the telephoto mode, is in the forwardmost position and is prevented from being thrust forwardly any farther by the fixed barrel 2, the thrusting lever 35 is prevented from being turned by the rotatable arm 43. In this condition, the rotatable arm 43 is forced to turn in the counterclockwise direction, forcing the connecting rod 41 to move along the slot 40 of the thrusting lever 35. As was previously stated, as the slot 40 is surrounded by the U-shaped slot 39, the connecting rod 41 can move along the slot 40 while deforming that portion of thrusting lever 35 wherein the slot 40 is formed. As a result, the thrusting lever 35 stores a return spring force which tends to thrust the movable barrel 3 forwardly, thus retaining the movable barrel 3 in the forwardmost position shown in FIG. 3.

As was described previously, when the link lever 48 is turned in the clockwise direction while retaining the movable barrel 3 in the forwardmost position, the link lever 48 via the push lug 51 thrusts the movable unit 5 forwardly, and with it the pin 52 of the movable unit 5. In this way, the taking lens system L is shifted into the macro mode from the telephoto mode and simultaneously, the gear 57 turns in the counterclockwise direction of FIG. 3 to slide the sliding plate 61 to the right through the cam follower lever 58 and the crank lever 60.

Figure 4C:
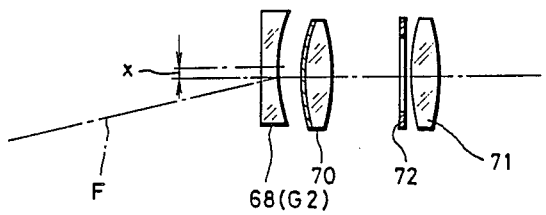

The movement of the sliding plate 61 to the right causes the raised portion 61c to push up the leg 68a so as to shift upwardly the second movable lens (G2) 68 a distance x as is shown in FIG. 4(C) in order to incline the optical axis F of the finder optical system downwardly. Due to this inclination of the optical axis F of the finder optical system, the finder cancels the error of parallax so as to be suitable for macro photography.

Upon the completion of shifting the movable unit 5 as well as the second movable lens (G2) 68 of the finder optical system, the motor 45 stops its rotation so as to complete shifting of the camera to the macro mode.

Upon pushing the mode selection button 7 when the camera is set to the telephoto mode, the motor 45 is caused to rotate, turning the gear 55 in the clockwise direction so as to turn the rotatable arm 43 in the same direction. Consequently, the movable barrel 3 is moved rearwardly in the fixed barrel 2 by the thrusting lever 35. By the rearward movement of the movable barrel 3, the lens holder 20 holding the conversion lens 12 is removed from the optical path P so as to place the taking lens system L in the wide-angle mode shown in FIG. 2(A).

It is to be noted that the movable barrel 3 is stopped by the rear end of the fixed barrel 2 and that the motor 45, after the stopping of the movable barrel 3, turns slightly more and then stops its rotation. This excessive turning of the motor 45 forces the rotatable arm 43 to swing in the counterclockwise direction as seen in FIG. 3 to cause pin 41 to resiliently deform the portion with the slot 40 formed in the thrusting lever 35. Due to the resilient deformation of the thrusting lever 35, the movable barrel 3 is maintained in its rearwardly moved position wherein the taking lens system L forms the lens arrangement for the wide-angle mode.

In cooperation with the movement of the movable barrel 3 to the wide mode position, the slidable plate 61 is shifted to the left from the position shown in FIG. 3, turning the lever 64 in the clockwise direction through the pin 64-slot 61 arrangement. Consequently, the lever 69 holding the second movable lens (G2) 68 is moved axially along the optical axis F of the finder optical system and, simultaneously, the lever 67 holding the first movable lens (G1) 66 is turned in the clockwise direction to bring the first movable lens (G1) 66 into alignment with the optical axis F. At this time, the raised portion 61d pushes up the leg 68a so as to raise the second movable lens (G2) 68 by a distance y as is shown in FIG. 4(A) in order to incline the optical axis F of the finder optical system downwardly, thereby deforming the finder optical system. As a result, the finder optical system cancels the parallax error and adjusts the magnification thereof suitably for wide-angle photography.

On the other hand, when pushing the mode selection button 7 when the camera is set to the wide-angle mode, the motor 45 starts its rotation to turn the rotatable arm 43 in the counterclockwise direction via gear 55, so as to thrust forward the movable barrel 3 by means of the thrusting lever 35. At the end of the thrusting movement of the movable barrel 3, lugs 3b on the movable barrel 3 abut against a rearwardly facing surface of the fixed barrel 2 before the motor 45 stops. Due to the further or excessive rotation of the motor 45, the portion with the slot 40 in the thrusting lever 35 is resiliently deformed by the pin 41 to store a restoring force in the thrusting lever 35 by which the movable barrel 3 is maintained in its telephoto mode position.

In cooperation with the movement of the movable barrel 3, the slidable plate 61 is moved so as to change the finder optical system from the wide-angle mode optical arrangement shown in FIG. 4(A) to the telephoto mode optical arrangement shown in FIG. 4(B).

It is to be understood that the distance x by which the second movable lens (G2) 68 is shifted upwardly when the camera is shifted to the macro mode is greater than the distance y when the camera is shifted to the wide-angle mode.

Figure 5:
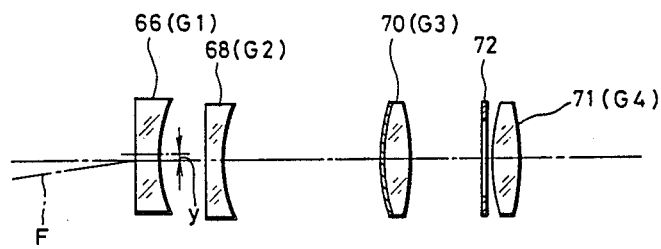
FIG. 5 is a diagrammatic illustration, similar to FIG. 4(A), showing an alternative embodiment of the viewfinder lens system.

Instead of shifting the second movable lens (G2) 68 upwardly by means of the raised portion 61d and the leg 68a of the second movable lens (G2) 68, the first movable lens (G1) 66 may be shifted by the distance y as is shown in FIG. 5. For the purpose of shifting the first movable lens (G1) 66, it is adapted to have its optical axis displaced upwardly from the axis F of the finder by the distance y when it is moved into the optical path of the finder.

Reference is now had to FIGS. 6 to 10 showing the zoom finder of another preferred embodiment of the present invention.

Figure 10A:
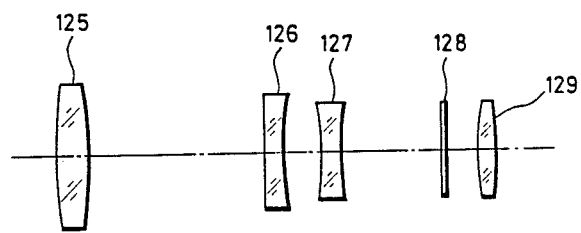
FIGS. 10(A) and (B) are diagrammatic illustrations showing a zoom finder lens system of FIG. 7.
Figure 10B:
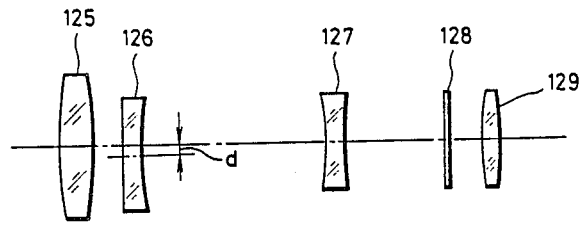
Figure 11A:
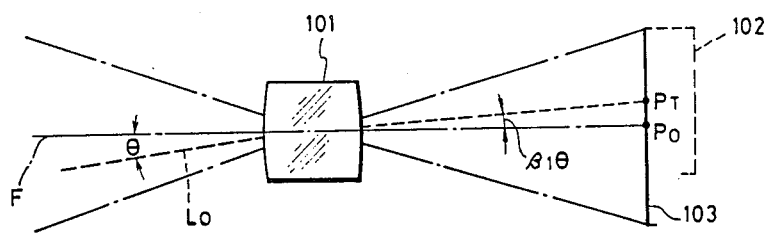
FIGS. 11(A) and (B) are diagrammatic illustrations showing the general principle of the zoom finder lens system.
Figure 11B:
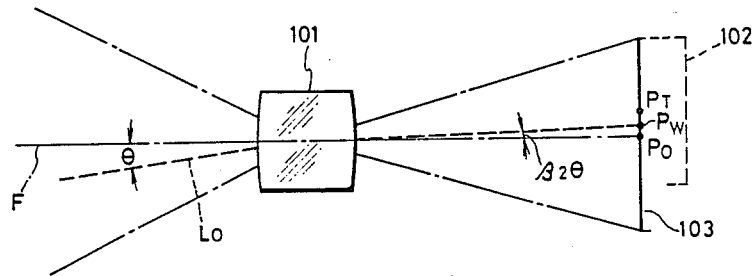
Figure 12:
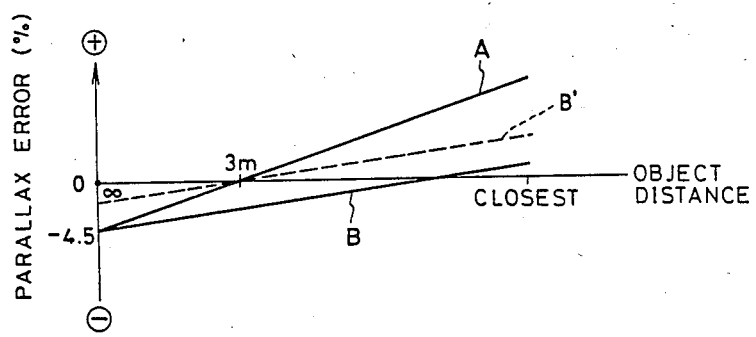
FIG. 12 is a graph showing the relationship between parallax error and object distance.
Figure 8:
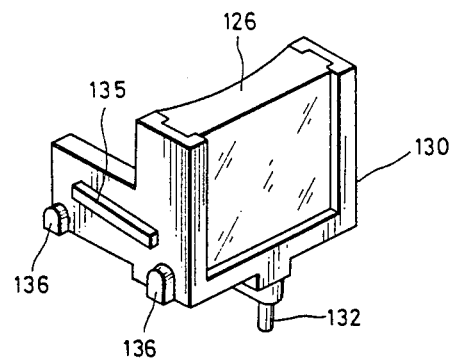
FIG. 8 is a perspective view showing a lens holder used in the finder of FIG. 7.
Figure 9:
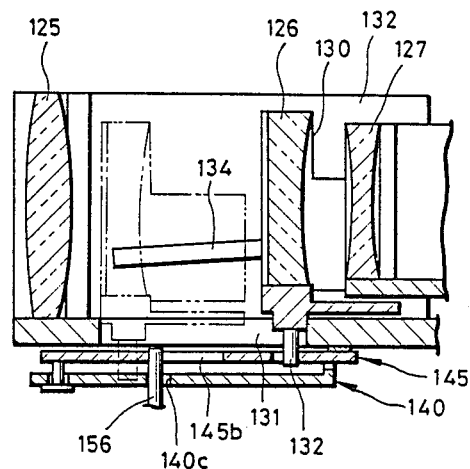
FIG. 9 is a cross sectional view of the zoom finder lens system of FIG. 7.

Before describing the zoom finder embodying the present invention in detail, reference is had to FIGS. 11 and 12 for the purpose of providing a brief background of a conventional zoom finder that will enhance an understanding of the function of the zoom finder optical system shown in FIG. 10.

In the case of cameras equipped with zoom lenses and zoom finders, parallax error is produced depending not only on the subject distance but on the magnification of the zoom finder. As is shown in FIG. 11(A), when a zoom finder lens system 101 is set for an extremity of the telephoto range, the main light $L_o$ from the center of the field of view at about 3 m from the camera enters the objective lens of the zoom finder lens system at an angle of incidence $\theta$, and exits from an eyepiece lens of the zoom finder lens system 101 at an angle $\beta_1\theta$ when the zoom finder has a magnification of $\beta_1$. A finder frame 102 of the zoom finder is so positioned as to have its center $P_T$ on the main light Lo from the center of the field o view.

Zoom finders are generally adapted to have a finder frame with its center $P_T$ fixed for a field of view at about 3 m from the camera which is the most popular object distance for telephotography. It is of course true that the finder frame 102 and its center $P_T$ fixed for a field of view at a distance of 3 m are different from the actual field of view 103 of the zoom finder with its center $P_o$, which is determined based on the main light from the center of a field of view at infinity; but this difference is practically not considered to be a serious parallax problem.

On the other hand, when the zoom finder is set for an extremity of the wide-angle range, the main light $L_o$ from the center of a field of view at about 3 m from the camera, which also enters the objective lens of the zoom finder lens system 101 at an incident able of $\theta$, exits at an angle of $\beta_2\theta$ when the zoom finder has a magnification of $\beta_2$ ($\beta_2$ being smaller than $\beta_1$). Therefore, the center $P_W$ of the finder frame 102 shifts downwardly from the center $P_T$. This deviation becomes largest at the extremity of the wide-angle range but smaller the longer is the focal length of the zoom finder lens system 101.

FIG. 12 shows the relationship between subject distance and parallax error of a zoom finder with a magnification of X2 when the center $P_T$ of the finder frame is determined in the same way as described regarding FIG. 11(A). In FIG. 12, the relationship between the subject distance and the parallax error of the zoom finder is indicated by a line A for an extremity of the telephoto range and by a line B for an extremity of the wide-angle range.

As was described previously, because the center $P_T$ of the finder frame is determined based on the center of the field of view at a distance of 3 m from the camera when the zoom finder lens system 101 is set at an extremity of the telephoto range, there is no substantial parallax error for a field of view at a distance of 3 m when the zoom finder lens system 101 is set at an extremity of the telephoto range. As the object distance becomes more or less than 3 m, the parallax error becomes larger. For example, at an object distance less than 3 m, the center of the field of view of the zoom finder is shifted above the center $P_T$ of the finder frame of the zoom finder. In FIG. 12, the amount of deviation of the center of the finder frame is referred to as a minus (−) parallax error when being shifted above the center of the field of view of the zoom finder and a plus (+) parallax error when shifted below the center of the field of view of the zoom finder. The parallax error is expressed as the ratio of vertical deviation of the center $P_T$ of the finder frame 102 from the center of the field of view relative to the length of a vertical side of the finder frame 102, in percentage.

As will be apparent from FIG. 12, the zoom finder 10 has an absolute parallax error of about −4.5% for an infinite object distance in the telephoto and wide-angle ranges and, therefore, there is no relative parallax error between the wide-angle range and the telephoto range. However, at an object distance of about 3 m, the zoom finder produces a relative parallax error of about −2% when it is in the wide-angle range as compared to when it is in the telephoto range. This relative parallax error becomes greater the less is the object distance.

When the zoom finder produces a relative parallax error due to changing the magnification of the zoom finder, the zoom finder and the zoom lens have different views of the scene. This leads to incorrect framing or incorrect focusing.

Figure 6:
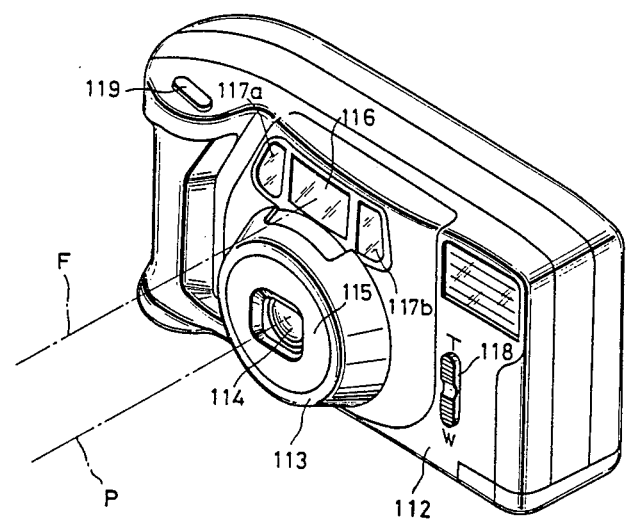
FIG. 6 is a perspective view showing a camera with a zoom finder embodying the present invention.

Referring now to FIG. 6 illustrating a camera embodying the present invention in which a zoom finder is incorporated, a camera body 112 is provided on its front wall with a zoom lens 114 held in a movable lens barrel 115 supported in a fixed barrel 113 for axial movement. Above the fixed barrel 113, there is a viewfinder window 116 and range finding windows 117a and 117b of an active-type automatic focusing device. Behind the viewfinder window 116, there is incorporated a zoom finder whose optical axis F is parallel to the optical axis P of the zoom lens 114.

Provided on the front wall of the camera body 112 is a zooming switch 118 for changing the focal length of the zoom lens 114 to a desired focal length so as to cover telephoto, standard or wide-angle ranges. This zoom switch 118, which is normally in the middle position shown in FIG. 6, is pushed up to continuously change the focal length of the zoom lens 114 toward the telephoto range "T" or down to continuously change the focal length of the zoom lens 114 toward the wide-angle range "W". When changing the focal length toward the telephoto range, the fixed barrel 115 is moved forward. In cooperation with changing the focal length of the zoom lens 114, the zoom finder is also changed in focal length, so that the zoom finder has a field of view corresponding to that of the zoom lens 114. After zooming, when a shutter release button 119 is depressed, the automatic focusing device is actuated to find the subject distance and then to focus the zoom lens on the subject, and thereafter, the shutter is released to make an exposure.

Figure 7:
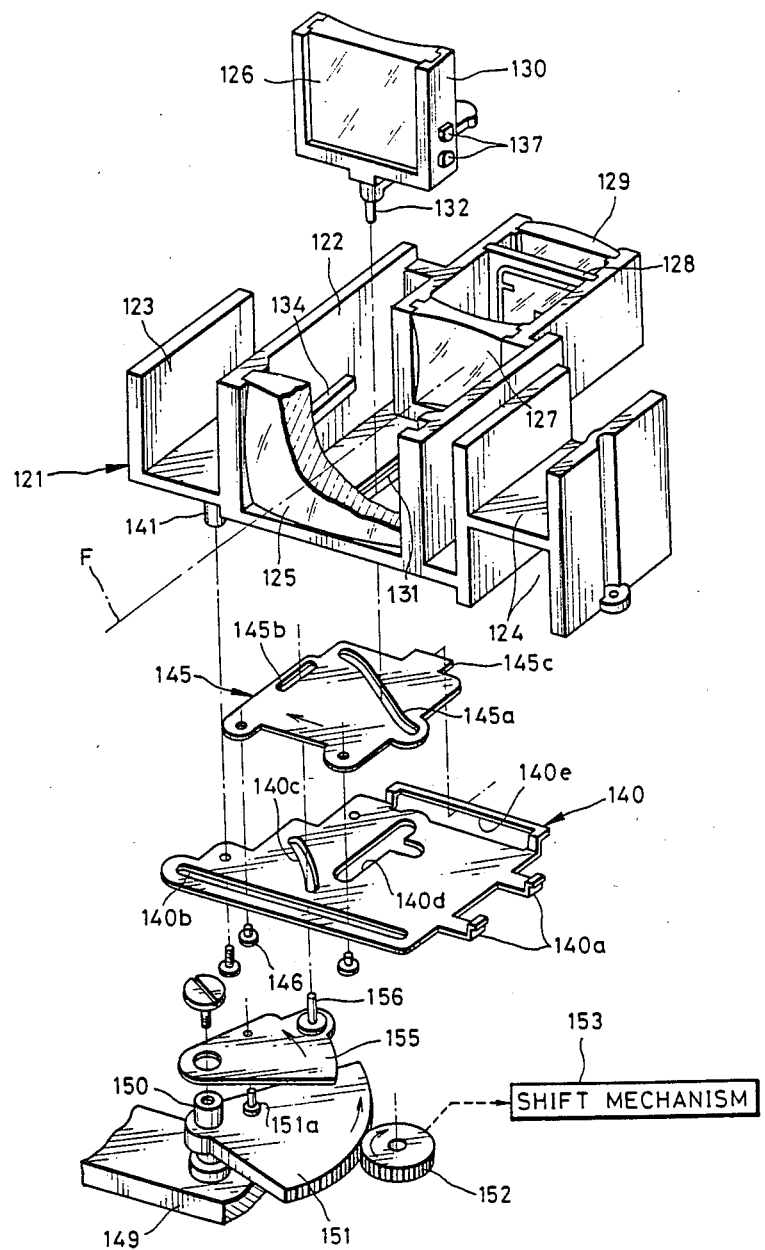
FIG. 7 is an exploded perspective view showing essential parts of the zoom finder according to the present invention.

Referring to FIG. 7 showing the zoom finder incorporated in the camera illustrated in FIG. 6, a viewfinder block 121 of plastic provides chambers 122, 123 and 124 for receiving therein the zoom finder optical system, the light projecting means and the light receiving means of the automatic focusing device, respectively. The zoom finder optical system disposed in the chamber 122 comprises an objective lens 125, a conversion lens 126 which is generally in the form of a concave lens, a correction lens 127, a reticle plate 128 and an eyepiece lens 129. The conversion lens 126 is held in a lens holder 130 which is axially movable along the optical axis F of the zoom finder optical system by means of a shift mechanism which will be described in detail later. The other elements, the lenses 125, 127 and 129 and the reticle 128, are fixed to the viewfinder block 121. As is well known in the art, the reticle 128 is formed with a viewfinder frame mark and a focusing target mark whose images are observed through the eyepiece lens 129.

In the bottom of the chamber 122 of the viewfinder block 121 there is formed a straight guide slot 131 extending in parallel with the optical axis F of the zoom finder lens system, in which a guide pin 132 integral with the lens holder 130 is slidably received. Integrally formed with inner surfaces of side walls defining the finder chamber 122 (one of which is hidden) are guide rails 134 slightly inclined downwardly toward the objective lens 125, which control the movement of the lens holder 130 between its upper and lower positions when the lens holder 130 move back and forth. As is shown in more detail in FIG. 8, the lens holder 130 is formed on its one side wall with a guide rail 135 and a pair projections 136 between which the guide rail 134 of the finder chamber 122 is slidably received. On the opposite side wall of the lens holder 130 there are formed a pair of projections 137 (FIG. 7) for slidably receiving therebetween the guide rail 134.

A fixing plate 140, which is attached to the bottom of the finder block 121, is formed with a guide slot 140b spaced from and perpendicular to the optical axis F of the finder lens system, a part-circular arcuate slot 140c, a straight slot 140d extending in parallel with the optical axis F of the finder lens system, and an opening 140e. For securing the fixing plate 140 to the finder block 121, the fixing plate 140 is provided with lugs 140a engagable in recesses formed in the finder block 121 and a hole through which a screw is fastened to a boss 141 of the finder block 121. Due to the length of the boss 141, the fixing plate 140 is attached to the finder frame 121 with a space provided therebetween.

In the space provided between the fixing plate and the finder block, there is disposed a cam plate 145 formed with a cam slot 145a, a slot 145b and a projection 145c. The projection 145c is slidably received in the opening 140e of the fixing plate 140. A pair of pins 146 is slidably received in the guide slot 140b of the fixing plate 140 and fixedly attached to the cam plate 145. The cam plate 145 thus incorporated between the finder block 121 and the fixing plate 140 is movable in a direction perpendicular to the optical axis F of the finder lens system. The guide pin 132 of the lens holder 130 extends through the guide slot 131 and is slidably received in the cam slot 145a.

Pivoted on a shaft 150 mounted on frame 149 inside the camera body 112 is a sector gear 151 in mesh with a gear 152 which is coupled to a reversible motor (not shown). When the zooming switch 118 is pushed up, the motor is rotated in the counterclockwise direction to turn the gear 152, thereby changing the focal length of the zoom lens system 114 toward the telephoto range through a shift mechanism 153. On the other hand, if the zoom switch 118 is pushed down, the motor is rotated in the clockwise direction to turn the gear 152, thereby changing the focal length of the zoom lens system 114 toward the wide angle range.

Pivoted coaxially with the sector gear 151 is a driving sector plate 155 which is operationally united by means of a pin 151a mounted on the sector gear 151 so as to turn integrally with the sector gear 151. The driving sector plate 155 is provided with a connecting pin 156 which passes through the part-circular arcuate slot 140c of the fixing plate 140 and is received in the slot 145b of the cam plate 145. As the circular arcuate slot 140c is formed to have its center at the shaft 150, the part-circular arcuate slot 140c allows the connecting pin 156 to move therein, thereby allowing the driving sector plate 155 to turn.

In the operation of the zoom finder constructed as above, upon pushing the zoom switch 118 down, the motor is caused to rotate the gear 152 in the clockwise direction shown by an arrow in FIG. 7, thereby shifting the focal length of the zoom lens system toward the wide-angle range through the shift mechanism 153.

By the clockwise rotation of the gear 152, the sector gear 151 and the driving sector plate 155 are turned together in the counterclockwise direction. Consequently, the cam plate 145 operationally coupled to the driving sector plate 155 through the connecting pin 156 is slid to move to the left as viewed in FIG. 7. This sliding movement of the cam plate 145 is guided by the arrangement of the guide slot 140b and pins 146 and the arrangement of projection 145c and guide opening 140e.

When the cam plate 145 is moved to the left, the lens holder 130 is thrust forwardly through the arrangement of the leg 132 and the cam slot 145a. Consequently, the lens holder 130 holding the conversion lens 126 is moved to a position shown by double dotted lines, wherein the conversion lens 126 is close to the objective lens 125, from the position shown by solid lines in FIG. 9.

Upon the movement of the lens holder 130 in the forward direction, the lens holder 130 is guided by the arrangement of the guide rails 134 and 135 and the projections 136 to move downward closer to the optical axis P of the zoom lens system 114. The amount of downward shift of the lens holder 130 is determined corresponding to the amount of axial movement of the lens holder 130 which depends on the possible magnification of the zoom finder or the focal length of the zoom lens 114.

Reference is now had to FIGS. 10(A) and (B) illustrating the optical system of the zoom finder of FIG. 7 shifted to an extremity of the telephoto range and of the wide-angle range, respectively. When shifting the zoo finder optical system toward the wide-angle range, the lens holder 130 with the conversion lens 126 is gradually shifted downwardly while being moved in the forward direction, until its optical axis is spaced below the optical axis P of the zoom lens 114 by the distance d at the extremity of the wide-angle range.

As a result of the downward shift, the conversion lens 126 (a concave lens) functions like an optical wedge to incline the optical axis F of the zoom finder upwardly. Therefore, when the finder optical system is at the extremity of the wide-angle range shown in FIG. 10(B), the main light Lo from the center of the field of view at about 3 m from the camera exits at an angle larger than $\beta_2 \theta$. By properly selecting the distance d, the main light Lo can coincide with the center $P_T$ of the field of view when the zoom finder lens system is at the extremity of the telephoto range.

When the zoom finder lens system is in a standard range between the telephoto and wide-angle ranges, the main light from the center of the field of view at about 3 m from the camera can coincide with the center $P_T$ of the field of view for the extremity of the telephoto range by properly selecting the distance d. The inclination of the guide rails 134 is determined in consideration of the amount of shift of the conversion lens 126 between the wide-angle and telephoto ranges. It is of course to be seen that the guide rail 134 may be curved if the conversion lens 126 has a relationship between axial movement and the amount of shift when is non-linear.

The correction of parallax error by shifting the conversion lens 126 means moving the line B parallel to itself to a line B' in FIG. 12. As will be apparent from FIG. 12, this increases the difference between the parallax error shown by the line A for the extremity of the telephoto range, and the corrected parallax error shown by the line B for the extremity of the wide-angle range over the possible objective distances. It is to be understood that the parallax error for a standard range between the telephoto and wide-angle ranges relative to object distance can be expressed by a line which intersects the line A at an object distance of 3 m and has a slope between those of the lines A and B. Therefore, it will be apparent that parallax error for standard ranges can be well corrected.

Although in the above embodiment it is intended to cause the center $P_W$ of the field of view of the zoom finder for the extremity of the wide-angle range to coincide with the center $P_T$ of the field of view of the zoom finder for the extremity of the telephoto range, it is equivalent to cause the center $P_T$ to coincide with the center $P_W$. Because the parallax error caused by the change of magnification of the zoom finder can be corrected only by shifting the conversion lens 126 and any other special mechanism is unnecessary, it is easy to incorporate, for example, a changeable finder frame for correcting parallax error caused as a result of change of object distance.

Although the present invention has been fully described by way of preferred embodiments thereof with reference to the accompanying drawings, it is to be noted that various changes and modifications will be apparent to those skilled in the art. Therefore, unless otherwise such changes and modifications depart from the true scope of the present invention, they should be construed as being included therein.

What is claimed is:

1. A camera having a viewfinder separate from a taking lens of the camera, said taking lens being changeable between a relatively short focal length suitable for wide-angle photography and a relatively long focal length suitable for telephotography, said viewfinder comprising:

an eyepiece lens fixed to a camera body of said camera;

a first movable lens disposed in front of said eyepiece lens which is axially moved when said taking lens is changed between said relatively short and long focal lengths;

a second movable lens adapted to be moved into the optical path of said finder and in front of said first movable lens when said taking lens is changed to have said relatively short focal length suitable for wide-angle photography; and means for shifting one of said first and second movable lenses away from the optical axis of said viewfinder relative to the optical axis of said taking lens when said taking lens is changed to have said relatively short focal length.

2. A camera as defined in claim 1, wherein said one of said first and second movable lenses is said first movable lens.

3. A camera as defined in claim 1, wherein said one of said first and second movable lenses is said second movable lens.

4. A camera having a viewfinder separate from a taking lens of the camera, said taking lens being changeable between a relatively short focal length suitable for wide-angle photography and a relatively long focal length suitable for telephotography and which allows close-up photography when said taking lens is changed to have said relatively long focal length, said viewfinder comprising:
- an eyepiece lens fixed to a camera body of said camera;
- a first movable lens disposed in front of said eyepiece lens;
- means for axially moving and shifting said first movable lens away from the optical axis of said viewfinder relative to the optical axis of said taking lens when said camera is changed for close-up photography; and
- a second movable lens adapted to be moved into the optical path of said viewfinder and in front of said first movable lens when said camera is changed to have said relatively short focal length suitable for wide-angle photography and to be displaced from said optical path when said camera is changed to have said relatively long focal length for telephotography.

5. A camera as defined in claim 4, and means shifting said first movable lens away from said optical axis of said viewfinder relative to the optical axis of said taking lens when said camera is changed suitably for telephotography.

6. A camera as defined in claim 5, wherein the amount of shift of said first movable lens is larger when said camera is changed suitably for close-up photography than when said camera is changed suitably for wide-angle photography.

7. A camera as defined in claim 5, further comprising means for operationally coupling said first and second movable lenses to a motor driven mechanism by which said taking lens is changed in focal length.

8. A camera as defined in claim 4 wherein said second movable lens has its optical axis shifted away from said optical axis of said viewfinder relative to said optical axis of said taking lens when moved in said optical path of said viewfinder.

9. A camera as defined in claim 8, further comprising means for operationally coupling said first and second movable lenses to a motor-driven mechanism by which said taking lens is changed in focal length.

10. A camera of the type having a zoom lens with variable focal length to cover wide-angle, standard and telephoto ranges, and
- a zoom finder on the camera and comprising:
- a conversion lens disposed between an eyepiece lens and an objective lens of said zoom finder and movable along the optical axis of said zoom finder;
- means for causing said axial movement of said conversion lens responsive to zooming of said zoom lens; and
- means for shifting said conversion lens toward or away from the axis of said zoom lens in cooperation with said axial movement of said conversion lens.

* * * * *